(12) United States Patent
Rogers (10) Patent No.: US 10,871,412 B2
(45) Date of Patent: Dec. 22, 2020

(54) PASSIVE WIRELESS MICROPHONE ARRAY

(71) Applicant: The Boeing Company, Chicago, IL (US)

(72) Inventor: John E. Rogers, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 190 days.

(21) Appl. No.: 16/201,778

(22) Filed: Nov. 27, 2018

(65) Prior Publication Data
US 2020/0166423 A1 May 28, 2020

(51) Int. Cl.
| | |
|---|---|
| *G01L 9/00* | (2006.01) |
| *G01L 9/12* | (2006.01) |
| *G01L 11/00* | (2006.01) |
| *H04R 23/02* | (2006.01) |
| *G01L 19/08* | (2006.01) |
| *H04R 1/40* | (2006.01) |

(52) U.S. Cl.
CPC .......... *G01L 9/0072* (2013.01); *G01L 19/086* (2013.01); *H04R 1/406* (2013.01)

(58) Field of Classification Search
CPC ..... G01L 7/00; G01L 7/08; G01L 9/00; G01L 9/0072; G01L 9/12; G01L 11/00–06; G01L 19/08; G01L 19/086; H04R 1/00; H04R 1/406; H04R 23/00–02
See application file for complete search history.

(56) References Cited

U.S. PATENT DOCUMENTS

| | | | | |
|---|---|---|---|---|
| 7,074,191 | B2 * | 7/2006 | Bosetto | A61M 1/3639 210/90 |
| 8,009,276 | B1 * | 8/2011 | Kirby | G01M 9/067 356/32 |
| 2005/0220310 | A1 * | 10/2005 | McGrath | H04R 23/00 381/56 |
| 2008/0282807 | A1 * | 11/2008 | Pepples | G01L 19/086 73/722 |
| 2014/0350348 | A1 * | 11/2014 | Tee | A61B 5/205 600/300 |
| 2017/0331160 | A1 * | 11/2017 | Mensah-Brown | H01M 10/46 |

FOREIGN PATENT DOCUMENTS

DE 102017109183 A1 * 10/2018 ............. G01L 11/00

OTHER PUBLICATIONS

Subramanian, H., et al., "Design and fabrication of wireless remotely readable MEMS based microaccelerometers," Smart Materials and Structures, Dec. 1997, pp. 730-738, vol. 6.

(Continued)

*Primary Examiner* — Nguyen Q. Ha
(74) *Attorney, Agent, or Firm* — Gates & Cooper LLP (57) ABSTRACT

An apparatus for measuring pressure is disclosed. The apparatus can be used to measure static pressures or dynamic pressures as would a conventional microphone, but can be integrated with antenna elements, and can be implemented without need for conductive elements in the array itself to provide the sensed pressure signal for processing. Instead, diaphragm movement is remotely and wirelessly sensed and used to determine pressure.

22 Claims, 10 Drawing Sheets

SIDE VIEW (56) References Cited

OTHER PUBLICATIONS

Rogers, J.E, et al., "A Passive Wireless Microelectromechanical Pressure Sensor for Harsh Environments", Journal of Microelectromechanical Systems, Feb. 2018, pp. 73-85, vol. 27, No. 1.
Hallil, H., et al., "Feasibility of Wireless Gas Detection with an FMCW RADAR Interrogation of Passive RF Gas Sensor", IEEE Sensors 2010 Conference, pp. 759-762.
Yi, X., et al., "Passive wireless smart-skin sensor using RFID-based folded patch antennas", International Journal of Smart and Nano Materials, 2011, vol. 2, No. 1, pp. 22-38.
Klejwa, N., et al., "A Reel-To-Reel Compatible Printed Accelerometer", Transducers '11, Beijing, China, Jun. 5-9, 2011, pp. 699-702.
Rogers, J.E., et al., "A microelectromechanical accelerometer fabricated using printed circuit processing techniques", Journal of Micromechanics and Microengineering, Dec. 2007, pp. 1-8, vol. 18, No. 1.

\* cited by examiner

PASSIVE WIRELESS MICROPHONE ARRAY

BACKGROUND

1. Field

The present disclosure relates to systems for measuring pressure, and in particular to a wireless and passive microphone array and a method for using and producing same.

2. Description of the Related Art

There is a need for the ability to measure pressure levels on outer aircraft surfaces such as wings and fuselages. Such pressure levels include static pressure levels to measure ambient pressure, as well as dynamic pressure levels, such as audible sound pressure and other aero-acoustic time-varying sound pressure levels. The measurement of ambient pressures can be used to determine altitude and wing/fuselage loads, and dynamic pressures can be used to monitor engine or airframe performance or to determine compliance with local sound ordinances or health ordinances involving worker safety.

It is also advantageous for such sensors to be capable of conforming to non-planar surfaces such as aircraft wings and fuselages. Such sensors, known as conformal sensors, substantially conform to the contours of the surface that they are mounted on or of which surface they form a part.

Existing pressure sensors including microphones typically have internal or local electronics to minimize parasitic and other unwanted noise to provide low-loss signals for processing. Such electronics require wiring for signal feeding and powering of the sensor and electronics. The addition of internal/local electronics are undesirable for sensor use in many application spaces such as high temperature or radioactive environments.

What is needed is a low-profile pressure sensor system that does not require internal or local electronics and can be used wirelessly.

SUMMARY

To address the requirements described above, this document discloses a planar antenna and a method for producing same. One embodiment is evidenced by an apparatus for measuring pressure is disclosed. One embodiment of the apparatus is evidenced by a circuit board having a composite dielectric which includes a first dielectric layer, a second dielectric layer, and a third dielectric layer. The first dielectric layer includes at least one conductive radio frequency (RF) element disposed thereon. The third dielectric layer has a conductive ground plane disposed thereon, and the second dielectric layer is disposed between the first dielectric layer and the third dielectric layer. The second dielectric layer includes a void at least partially forming a cavity between the first dielectric layer and the third dielectric layer between the conductive RF element and the conductive ground plane. Furthermore, the first dielectric layer forms a pressure sensitive diaphragm with the cavity.

In an exemplary embodiment, the apparatus further including: a transmitter, for transmitting an incident electromagnetic wave to the pressure sensor, a receiver, for wirelessly receiving a reflected electromagnetic wave, the reflected electromagnetic wave being a portion of the incident electromagnetic wave reflected from the conductive RF element displaced by diaphragm movement due to the pressure and a processor, electrically connected to the receiver for processing the received reflected electromagnetic wave to determine the measured pressure. In another embodiment, the conductive RF element and the conductive ground plane together form a patch antenna element and the processor determines the measured pressure by processing the received reflected electromagnetic wave to determine an electromagnetic resonance of the patch antenna element. In still another embodiment, processor determines the measured pressure by processing the received reflected electromagnetic wave to determine a doppler shift between the incident electromagnetic wave and the reflected electromagnetic wave. In still a further embodiment, the incident electromagnetic wave includes a modulated signal generated by the transmitter, and the processor determines the measured pressure by processing the received reflected electromagnetic wave to determine a phase shift or amplitude shift of the modulated signal.

A further embodiment is evidenced by a method of measuring pressure. The method includes transmitting an incident electromagnetic wave to interrogate an integrated antenna and pressure sensor, wirelessly receiving a reflected electromagnetic wave, the reflected electromagnetic wave being a portion of the incident electromagnetic wave reflected from a conductive RF element displaced by a diaphragm movement due to the pressure and processing the received reflected electromagnetic wave to determine the measured pressure. In this embodiment, the pressure sensor includes a circuit board having a composite dielectric including: a first dielectric layer, having at least one conductive RF element disposed thereon, a third dielectric layer, having a conductive ground plane disposed thereon, and a second dielectric layer, disposed between the first dielectric layer and the third dielectric layer. The second dielectric layer includes a void at least partially forming a cavity between the first dielectric layer and the third dielectric layer between the conductive RF element and the conductive ground plane. Furthermore, the first dielectric layer forms a pressure sensitive diaphragm with the cavity.

A still further embodiment is evidenced by a method of forming an integrated antenna and pressure sensor, including: disposing a conductive RF element on a top surface of a first dielectric layer, disposing a conductive ground plane on a top surface of a third dielectric layer, processing a second dielectric layer to create a void therein, laminating the first dielectric layer, the second dielectric layer and the third dielectric layer, where upon lamination, the void is disposed between the conductive RF element and the conductive ground plane and forms a cavity disposed between the conductive RF element and the conductive ground plane. An even further embodiment is evidenced by an integrated antenna and pressure sensor, formed by performing the foregoing process.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

In this disclosure, a microphone array is discussed that is both passive (i.e., no internal energy source such as a battery) and wireless (i.e., no connecting wires) in nature. The microphone array operates in the far-field and is interrogated with linear or circular electromagnetic plane waves. A portion of the incident electromagnetic plane wave is reflected to a receiver where the signal is processed to determine the sound pressure level, whether static (i.e., time invariant) or dynamic (time variant), at an acoustic frequency of interest. In this way, the microphone sensor and the transmit/receive electronics are separated from one another allowing the sensor to operate in a passive wireless fashion. The sensor can be fabricated using either subtractive (e.g., milling, wet etching, laser etching) or additive (e.g., printing or film deposition) methods. Furthermore, with the appropriate materials this microphone array could operate in high temperature or radioactive environments.

The microphone array comprises a number of features which can be characterized by a number of embodiments. Such features may also be combined in selected embodiments as disclosed further herein. For example, in one embodiment, the microphone array is both passive (i.e., no internal energy source such as a battery) and wireless (i.e., no connecting wires). In selected embodiments, the microphone array is able to operate in harsh environments (e.g., high temperature, corrosive, radioactive), and is surface agnostic (i.e., electrical performance is not dependent on surface type). The microphone array can be designed to sense broadband acoustic sound pressure levels utilizing size varying RF antenna elements and can be manufactured using additive printing techniques. The microphone array can also be designed to operate with circularly polarized electromagnetic waves to improve discrimination between information-bearing reflected electromagnetic waves and background noise or unwanted signals.

Figure 1A:
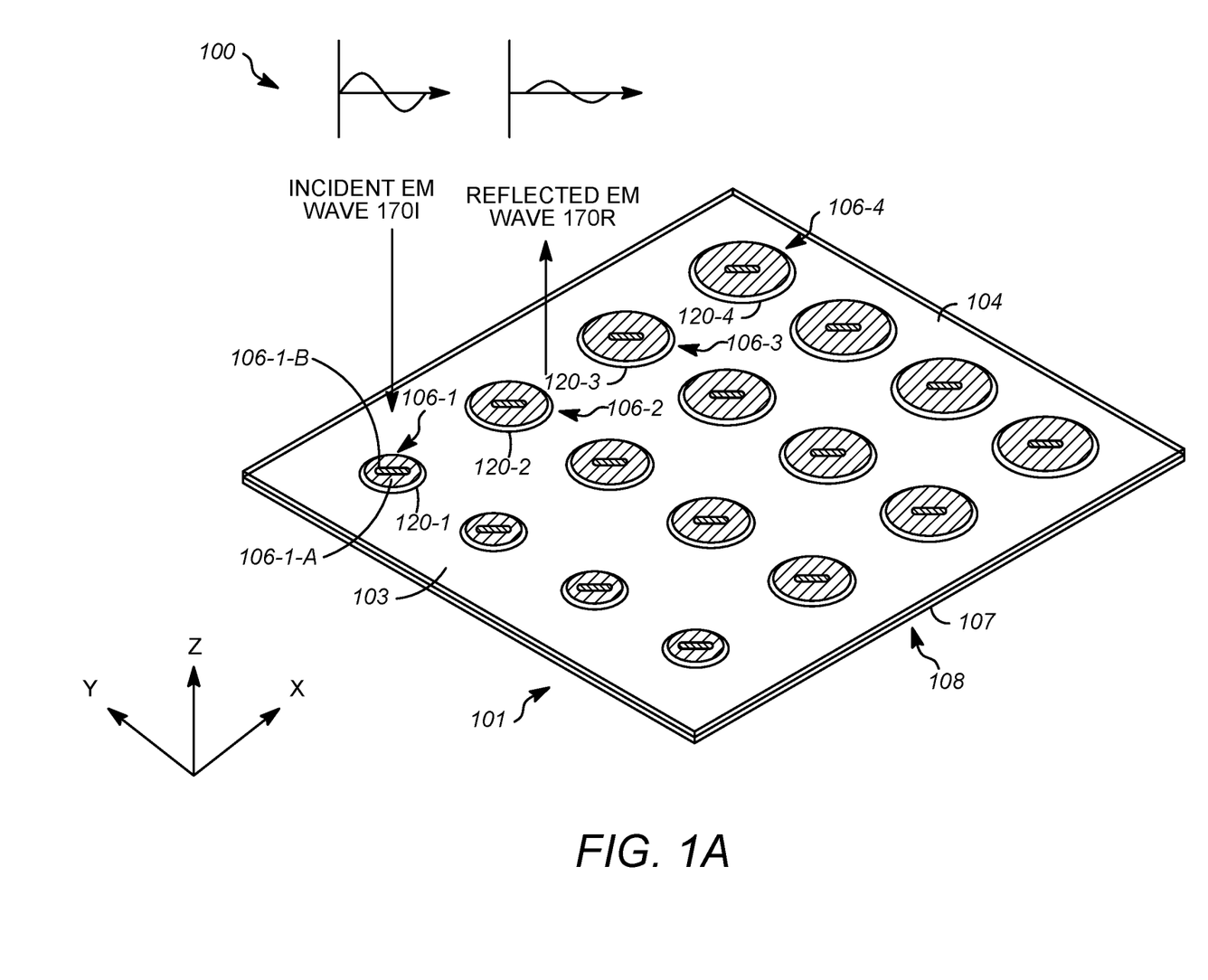
FIGS. 1A and 1B are diagrams illustrating one embodiment of the pressure sensor array.
Figure 1B:
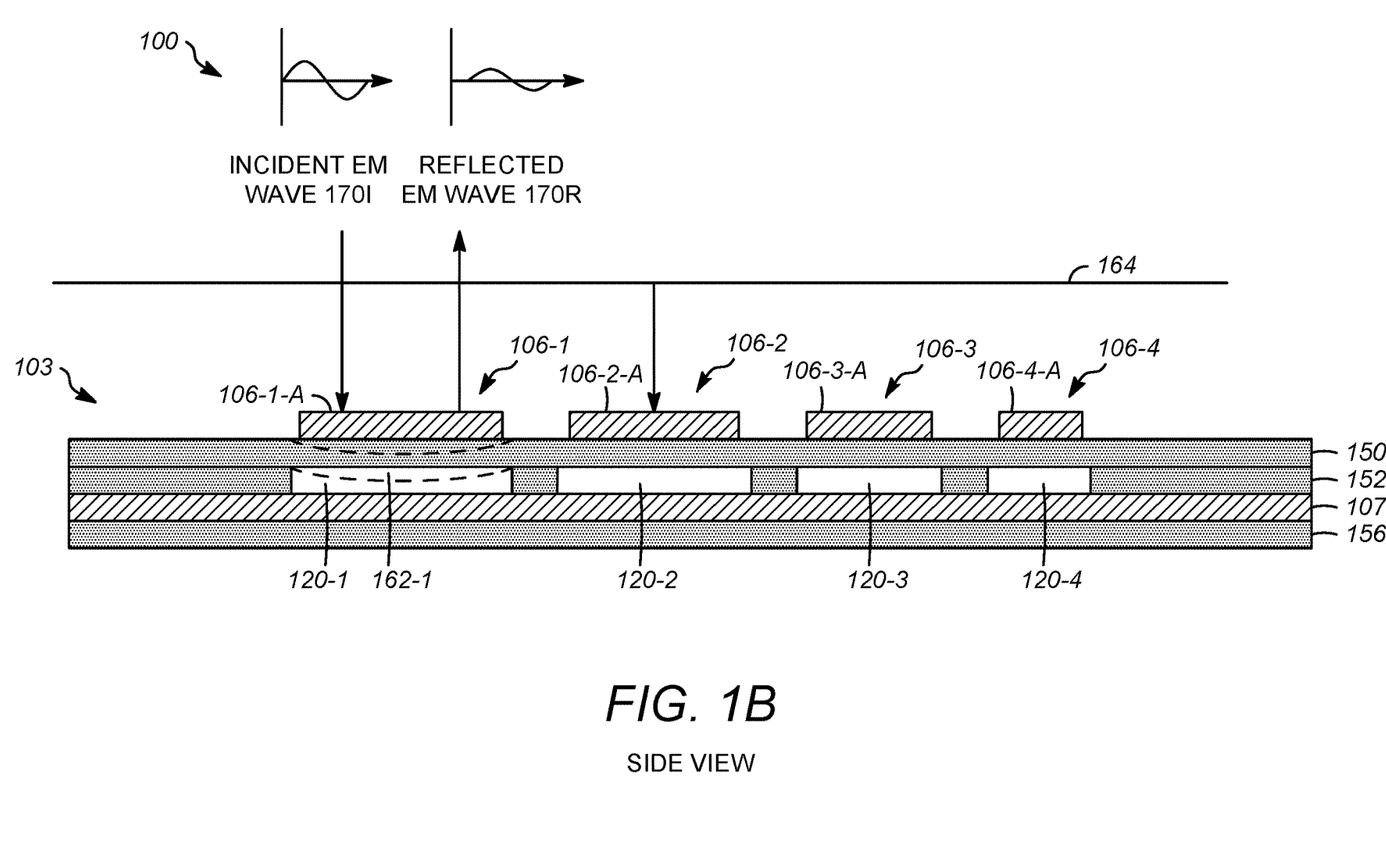

FIGS. 1A and 1B are diagrams illustrating one embodiment of the pressure sensor array 100. FIG. 1A presents a perspective view of the pressure sensor array 100, while FIG. 1B illustrates a side view of the pressure sensor array 100.

Turning first to FIG. 1A, the pressure sensor array 100 includes an RF circuit board 101 having a composite dielectric 103, having a top planar surface 104. The top planar surface 104 has a plurality of pressure sensors 106-1, 106-2, 106-3, and 106-4. The pressure sensors 106-1, 106-2, 106-3, and 106-4 are formed by conductive RF elements 106-1-A, 106-2-A, 106-3-A and 106-4-A having slots or apertures 106-1-B, 106-2-B, 106-3-B and 106-4-B respectively disposed over a conductive ground plane 107, each with a respective cavity 120-1, 120-2, 120-3, and 120-4 disposed therebetween. Hereinafter, pressure sensors 106-1, 106-2, 106-3, and 106-4 and their corresponding conductive RF elements 106-1-A, 106-2-A, 106-3-A and 106-4-A and cavities 120-1, 120-2, 120-3, and 120-4 are alternatively referred to as pressure sensor(s), conductive RF element(s) 106-A, slots 106-B and cavities 120. In the illustrated embodiment, the top planar surface 104 comprises four rows of conductive RF elements 106-1-A, 106-2-A, 106-3-A and 106-4-A, thus forming a 4×4 array of sixteen conductive RF elements. However, embodiments include a circuit board 101 having only one pressure sensor 106 and having an array with a greater or lesser number of pressure sensors 106. Also in the illustrated embodiment, the conductive RF elements 106-1-A, 106-2-A, 106-3-A and 106-4-A are of different diameters, as are the respective cavities respective cavity 120-1, 120-2, 120-3, and 120-4, and thus each cavity 120-1, 120-2, 120-3, and 120-4 has a different volume than other of the cavities in the same column. Use of different cavity and RF element sizes permits each pressure sensor 106 to be optimized to operate using incident EM waves of different frequency regimes and also permits pressure sensors 106 with different acoustic resonances, allowing the pressure sensors 106 to be optimized for different acoustic frequency regimes.

The RF circuit board 101 also comprises a bottom planar surface 108, with a conductive ground plane 107 therebetween the top planar surface 104 and bottom planar surface 108. The slot 106-B of each pressure sensor 106 causes the reflected electromagnetic wave 170R resulting from an incident electromagnetic wave 170I to be of a circular polarization type, thus permitting the advantages further discussed below.

FIG. 1B is a diagram illustrating a side view of the pressure sensor array 100. The composite dielectric 103 comprises a first dielectric layer 150 having at least one conductive RF element 106-1-A disposed on a top surface. The composite dielectric 103 further comprises a third dielectric layer 156 having a conductive ground plane 107 disposed on its top surface, and a second dielectric layer 152 disposed between the first dielectric layer 150 and the third dielectric layer 156. The second dielectric layer 152 is disposed between the first dielectric layer 150 and the third dielectric layer 156 and comprises a void that at least partially forms a cavity (120-1) between the first dielectric layer 150 and the third dielectric layer 156, with the cavity 120-1 disposed between the conductive RF element 106-1-A and the conductive ground plane 107. The cavity 120-1 allows the portion of the first dielectric layer 150 adjacent the cavity 120-1 to form a pressure sensitive diaphragm (e.g. 162-1) that moves when subjected to sound waves or pressure differentials between the exterior of the pressure sensor 106 and the cavity 120-1.

In the illustrated embodiment, the pressure sensor array 100 comprises a plurality of pressure sensors 106-1, 106-2, 106-3, and 106-4, each having an associated cavity 120-1, 120-2, 120-3, and 120-4, respectively, thus forming a pressure sensor having an associated pressure sensitive diaphragm. Further, the conductive RF elements 106-1-A, 106-2-A, 106-3-A, and 106-4-A and associated cavities 120-1, 120-2, 120-3, and 120-4 are of differing sizes. For example, the illustrated conductive RF elements 106-1-A, 106-2-A, 106-3-A, and 106-4 and associated cavities 120-1, 120-2, 120-3, and 120-4 are cylindrical with different diameters (e.g. cavity 120-1 being of larger diameter than cavity 120-2, which in turn has a larger diameter than cavity 120-3, which also has a larger diameter than cavity 120-4).

The use of multiple pressure sensors 106 permits the measurement of localized pressures and the ability to measure phase differences between such localized pressures. Also, the use of different sized cavities 120 permits sound pressures to be measured at different acoustic frequencies using incident electromagnetic waves 170I of broadband frequencies.

The diameter of the conductive RF elements 106-1-A, 106-2-A, 106-3-A and 106-4-A is typically chosen to select a desired electrical resonance of the circuit formed by the conductive RF elements 106-1-A, 106-2-A, 106-3-A and 106-4-A and the conductive ground plane 107, and the diameter of the cavities 120 is chosen to be larger than the corresponding diameter of the associated conductive RF elements 106-1-A. This helps to maximize the pressure sensor's sensitivity at some electromagnetic operating frequency. However, different conductive RF element to cavity dimensional relationships may be selected.

One advantage of the foregoing construction is that the conductive RF elements 106-1-A, 106-2-A, 106-3-A and 106-4-A may also be used as patch antenna elements in a conformal antenna used to transmit RF signals to nearby receivers or receive RF signals from nearby receivers. This can be implemented using a microstrip feed disposed below the conductive RF elements 106-1-A, 106-2-A, 106-3-A and 106-4-A formed by a conductor disposed between the conductive RF elements 106-1-A, 106-2-A, 106-3-A and 106-4-A, the conductive ground plane 107, and dielectric material disposed therebetween. In such cases, the aperture or slot 106-1-B also couples the conductive RF element 106-1-A to the microstrip feed, which can be used to provide a signal to the patch antenna element for transmission or to provide signal received by patch antenna element to a receiver.

Operation

The diaphragm 162-1 is displaced in a substantially vertical direction (as indicated by the dashed lines in FIG. 1B) according to differences between the ambient pressure (i.e., environment) and the pressure inside the cavity 120-1. Such pressure differences may be static (i.e., time invariant) or dynamic (i.e., time variant). For example, a positive acoustic wave 164 incident on the conductive RF element 106-1-A and diaphragm 162-1 displace the conductive RF element 106-1-A and diaphragm 162-1 closer to the conductive ground plane 107. Similarly, a positive static pressure change external to the pressure sensor array 100 may create a static pressure differential between the cavity 120-1 and the outside surface of the diaphragm 162-1, which displaces the conductive RF element 106-1-A and diaphragm 162-1 closer to the conductive ground plane 107. In these cases, such displacements may be measured using the techniques described below using changes between an incident EM wave 170I and a reflected EM wave 170R.

Figure 2:
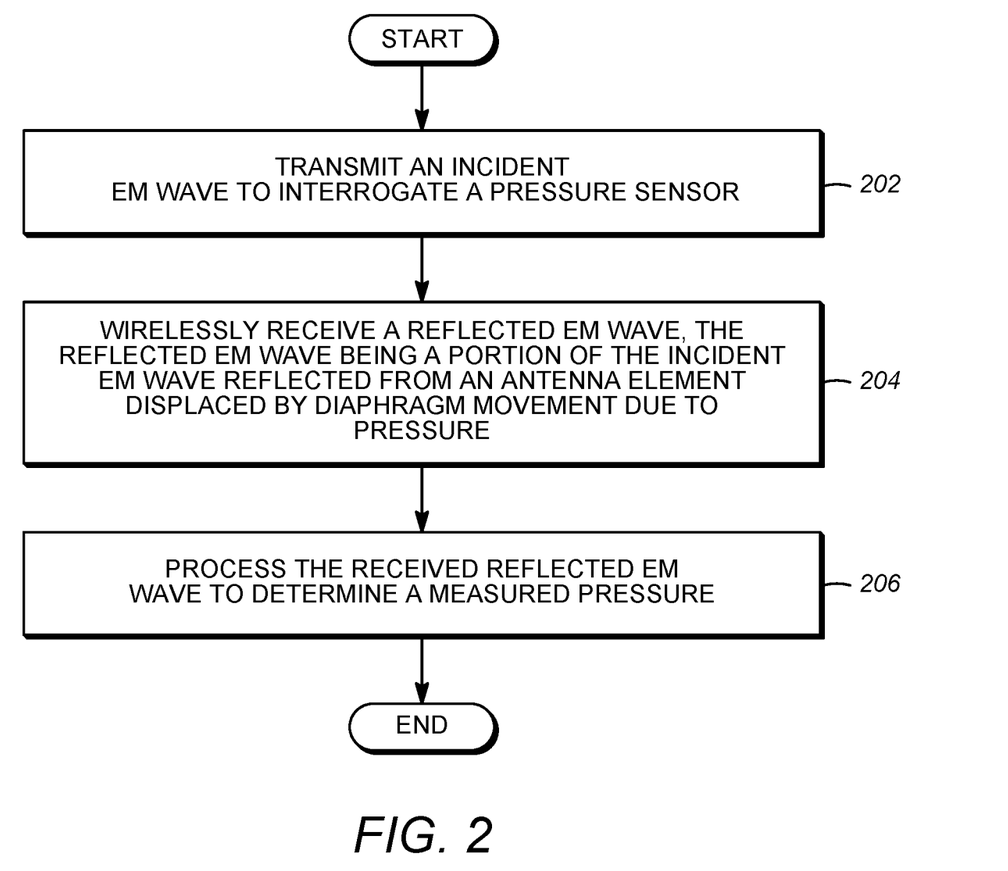
FIG. 2 is a diagram illustrating exemplary steps that can be used to determine a measured pressure using the pressure sensor array.

FIG. 2 is a diagram illustrating exemplary steps that can be used to determine a measured pressure using the pressure sensor array 100. In block 202, an incident EM wave 170I is transmitted to interrogate a pressure sensor 106. The incident EM wave 170I is reflected off of the conductive RF element 106A of the pressure sensor 106, which has been displaced by movement of the diaphragm 162-1 due to change in ambient pressure or a pressure wave 164, thus creating a reflected EM wave 170R. In block 204, the reflected EM wave 170R is wirelessly received. In block 206, the received reflected EM wave 170R is processed to determine a measured pressure. Typically, such processing compares the incident EM wave 170I with the reflected EM wave 170R.

Measurement Modalities

Doppler Shift

The foregoing measurement paradigm permits a variety of measurement modalities. In one embodiment, the processor determines the measured pressure by processing the received reflected electromagnetic wave to determine a doppler shift between the incident electromagnetic wave 170I and the reflected electromagnetic wave 170R. The doppler shift is proportional to the velocity of the conductive RF element 106-1-A and its adjacent diaphragm 162-1, and can be used to derive measurements derive time-varying pressures such as those associated with sound or an acoustic wave. In this case, the incident EM wave 170I may comprise a single frequency, a combination of frequencies, or a spectrum of frequencies. The incident EM wave 170I may also be a modulated signal (e.g., frequency modulated continuous wave), with a phase or frequency shift between the incident EM wave 170I and the reflected EM wave 170R being functionally related to a sound pressure measurement.

Amplitude and/or Phase Shift

In another embodiment, the incident electromagnetic wave comprises a modulated signal, and the pressure is determined by processing the received reflected EM wave 170R to determine a phase shift and/or amplitude shift between the incident EM wave 170I and the reflected EM wave 170R. The sensed phase shifts may be due to changes in the electrical resonance of the pressure sensors 106, which are a result from motion of the diaphragm itself.

Figure 3:
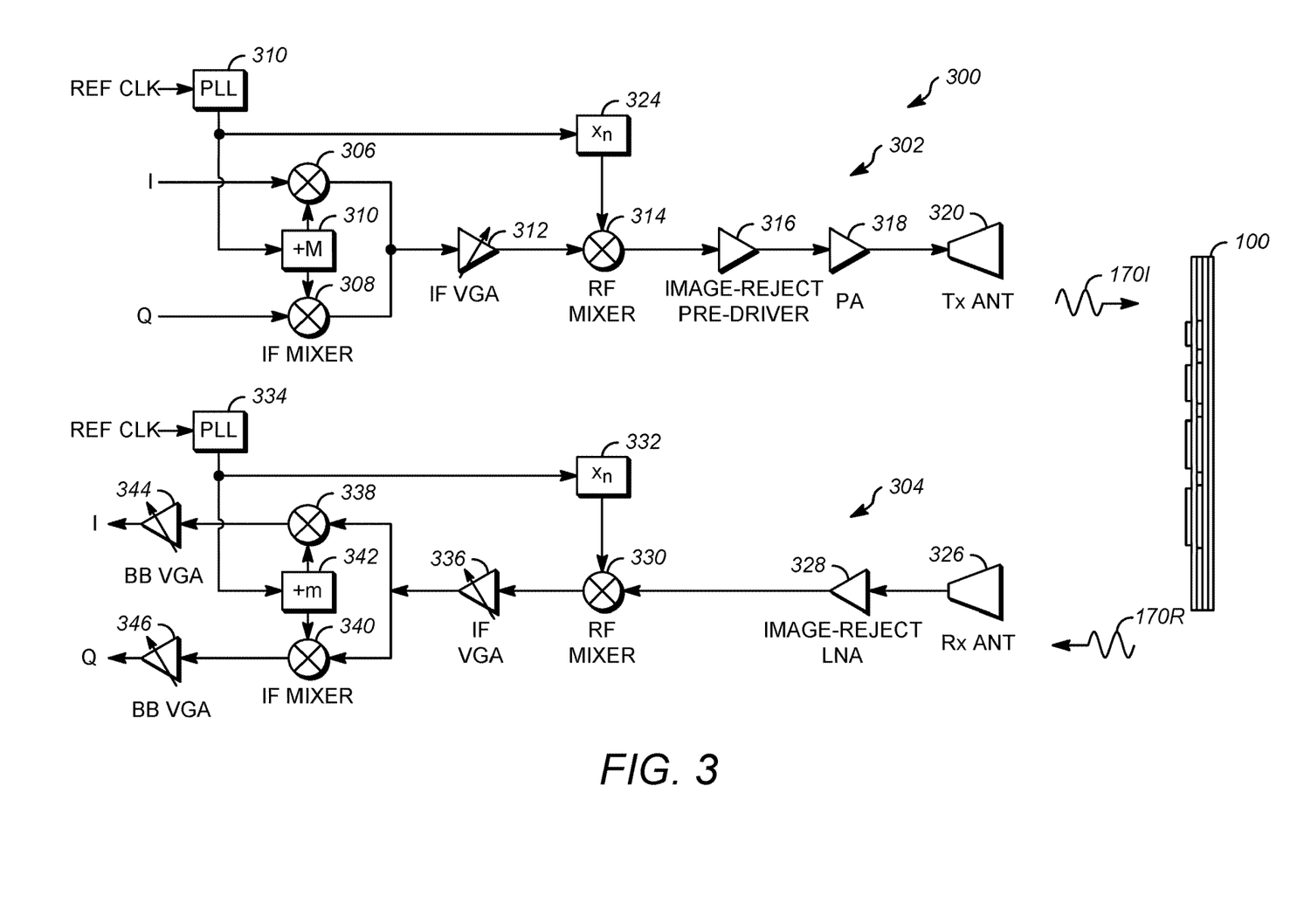
FIG. 3 is a diagram illustrating one embodiment of a pressure measuring apparatus.

FIG. 3 is a diagram illustrating one embodiment of a pressure measuring apparatus 300. In this embodiment, a backend transmitter (Tx) 302 is configured such as to transmit one or more electromagnetic waves in close proximity to an electrical resonant frequency of a pressure sensor 106. A portion of the electromagnetic wave that is incident on the pressure sensor 106 is then reflected back to a receiver (Rx) 304 where it is demodulated, and the magnitude and/or phase is extracted to determine the sound pressure level incident on the diaphragm associated with the conductive RF element 106-1-A, 106-2-A, 106-3-A and 106-4-A.

A reference clock is provided to a phase locked loop (PLL) oscillator 310. The frequency output of the PLL oscillator 310 is provided to phase shifter 311 to convert the frequency output of the PLL oscillator to a local oscillator (LO) signal. A first baseband signal component (I) and a second baseband signal component (Q) phase shifted 90 degrees from the first baseband component are then frequency mixed with LO signal using IF mixer 306 and IF mixer 308, respectively to produce an intermediate frequency (IF) signal.

The resulting IF signal with I and Q baseband signal components are combined to form a phase quadrature IQ signal in the IF band, which is provided to a variable gain IF amplifier 312 and thence to an RF mixer 314, which up-converts the phase quadrature IQ signal from the IF band to the RF band using a second LO mixing signal created from the frequency output of the PLL oscillator 310 by frequency converter 324. The resulting RF band IQ signal is provided to an image rejecting pre-driver 316 and thence to a power amplifier 318 and transmit antenna 320, resulting in the transmitted incident electromagnetic wave 170I. The transmitted incident electromagnetic wave 170I reflects off of the conductive RF elements 106-1-A of the pressure sensors 106 of the pressure sensor array 100 to create the reflected electromagnetic wave 170R.

The reflected electromagnetic wave 170R is received by the receive antenna 326 of the receiver 304, amplified by image-rejecting low noise amplifier (LNA) 328, and mixed with an LO mixing signal using RF mixer 330 to down-convert the IQ signal from the RF band to the IF band. The LO mixing signal is a version of the frequency output of the PLL oscillator 334 converted up by frequency converter 332. The IF band IQ signal is provided to an IF variable gain amplifier 336 for amplification. The I component of the IF band IQ signal are recovered by frequency mixing the IQ signal with a first LO signal with IF mixer 338 and mixing the IQ signal with a second LO signal (phase shifted from the first LO signal by 90 degrees by phase shifter 342) using IF mixer 340. The first IF mixer 338 recovers a version of the I baseband signal component of the incoming IF signal, and the second IF mixer 340 recovers a version of the Q baseband signal component of the incoming IF signal. The resulting I baseband signal component is then amplified by baseband variable gain amplifier 344 and the Q baseband signal component is amplified by baseband variable gain amplifier 346.

The I and Q baseband signal components undergo a change in amplitude and/or phase when reflected by the conductive RF elements 106-1-A, 106-2-A, 106-3-A and 106-4-A, and these changes are functionally related to the state of the diaphragm 162-1 of each pressure sensor 106.

For example, each pressure sensor 106 of the pressure sensor array 100 has an electrical resonant frequency determined primarily by the capacitance between the conductive RF element 106-1-A and the conductive ground plane 107, which is a function of the vertical distance between the conductive RF element 106-1-A and the conductive ground plane 107. Accordingly, the electrical resonant frequency of the pressure sensor 106 will change as the diaphragm 162-1 displaces back and forth due to differences between the pressure external to the cavity 120-1 and pressure within the cavity 120-1. Such pressure differences may be static (i.e., time invariant) or dynamic (i.e., time variant).

When measuring static pressure, the diaphragm 162-1 is deflected such that the height of the cavity 120-1 has changed, thus changing the electrical resonance of the pressure sensor 106. Changes in the electrical resonance changes the amplitude and phase relationship of the reflected electromagnetic wave at frequencies near the electrical resonant frequency, and these changes can be used to determine the measured pressure. In one embodiment, the incident electromagnetic wave comprises a series of signals that sweeps in frequency between 9 and 11 GHz, thus covering the electrical resonant frequency of the pressure sensor (e.g., 10 GHz). Since changes in pressure result in changes in the resonant frequency, the pressure may be determined by measuring the changes in the resonant frequency from the measured amplitude and/or phase of the reflected electromagnetic wave.

Phase changes between the incident EM wave 170I and the reflected EM wave 170R can also be used to discern pressures in audible frequency range (e.g. 20 Hz to 20 kHz), subsonic frequency range (0 to 20 Hz), or supersonic frequency range (greater than 20 kHz). Such phase changes occur due to the vibrations in of the conductive RF element 106-1-A due to diaphragm 162-1 deflections.

Figure 4:
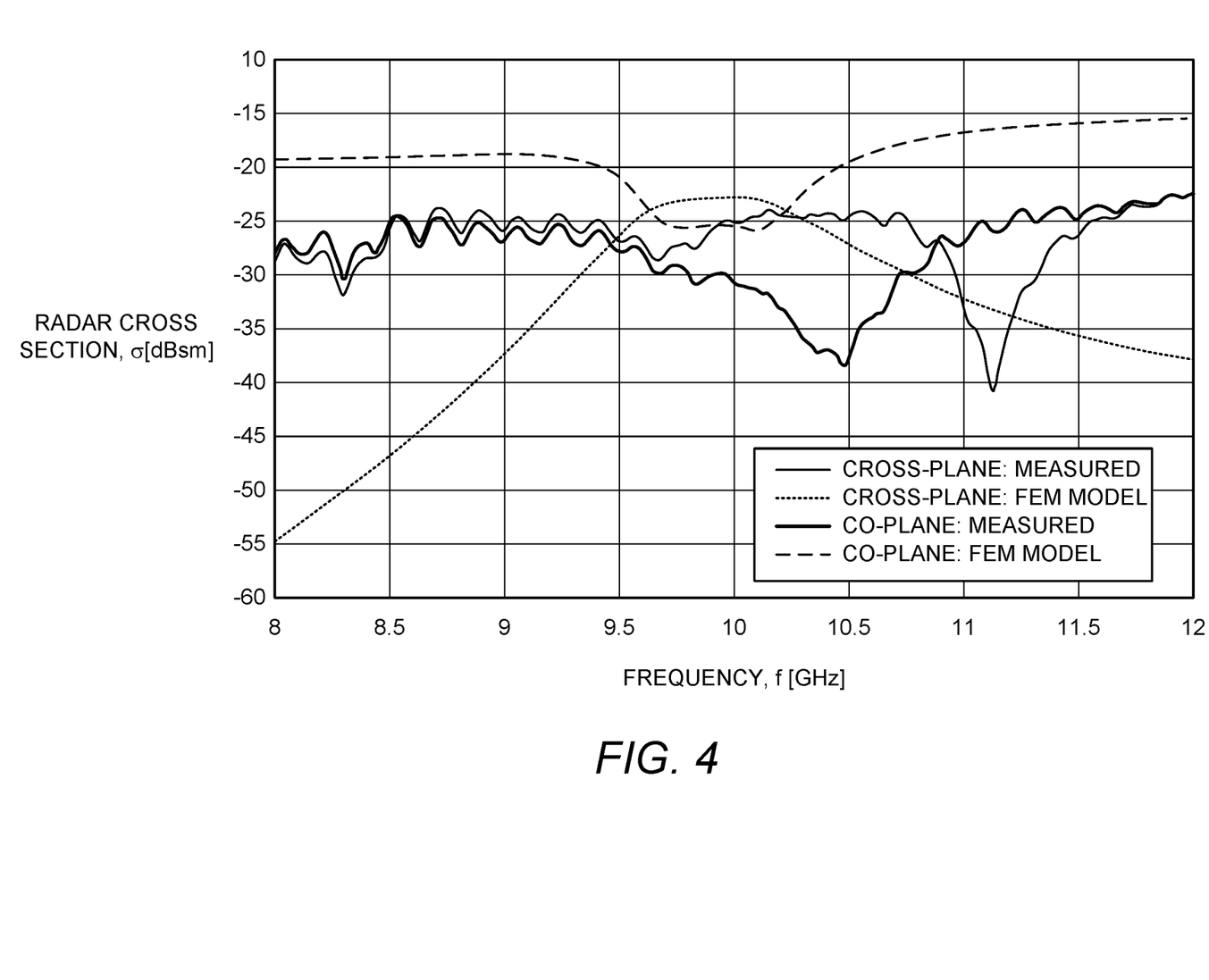
FIG. 4 is a diagram illustrating both predicted and measured characteristics of a 2×2 pressure sensor array.

FIG. 4 is a diagram illustrating both predicted and measured characteristics of a 2×2 pressure sensor array 100 having an electrical resonant frequency of 10 GHz. The results are illustrated in terms of the radar cross section ($\sigma$) in decibels per square meter (dBsm). The dashed line indicates the radar cross section as predicted by a finite element model (FEM), with the upper line representing the radar cross section of the reflected EM wave 170R in the same polarization plane as the incident EM wave 170I, and the lower dashed line representing the radar cross section of the reflected EM wave 170R in cross plane of the incident EM wave 170I. Note that since the resonant frequency of the pressure sensors 106 was designed to be 10 GHz, there is a dip in the co-planar reflected energy in this frequency region. The solid lines indicate the radar cross section as measured, with the lower solid line representing the radar cross section of the reflected EM wave 170R in the same polarization plane as the incident EM wave 170I, and the uppers solid line representing the radar cross section of the reflected EM wave 170R in cross plane of the incident EM wave 170I. Note that the measured results show reasonably good agreement with the predicted results, particularly in the co-plane measurements.

The polarization of the incident EM wave 170I can be linear or circular, but circular polarization is preferred. That is because a linearly polarized transmit antenna 320 transmits a linearly polarized incident EM wave and can only effectively communicate with a linearly polarized receive antenna 326 if they are physically aligned with one another, which can be very difficult to do in practice. However, a circularly polarized transmit antenna 320 transmits a circularly polarized incident EM wave that can effectively deliver half-power to a linearly polarized receive antenna 326 at any planar relative orientation, and can deliver full power to a circularly polarized receive antenna 326 of the same polarization type at any planar orientation. For example, if the transmit antenna 320 is a right hand circularly polarized antenna that produces a right hand circularly polarized incident EM wave, full power can be delivered to a right hand circularly polarized receive antenna 326 regardless of the relative orientation of the transmit antenna 320 and the receive antenna 326. As described above, the slot 106-1-B in the conductive RF element 106-1-A helps assure that the reflected EM wave is of circular polarization. In embodiments where the conductive RF element and conductive ground plane together form a patch element for transmitting or receiving electromagnetic waves independent of the incident EM wave and the reflected EM wave, the polarization of the incident EM wave 170I can also be chosen to be orthogonal to the polarization of such independent electromagnetic waves to reduce interference.

Figure 5:
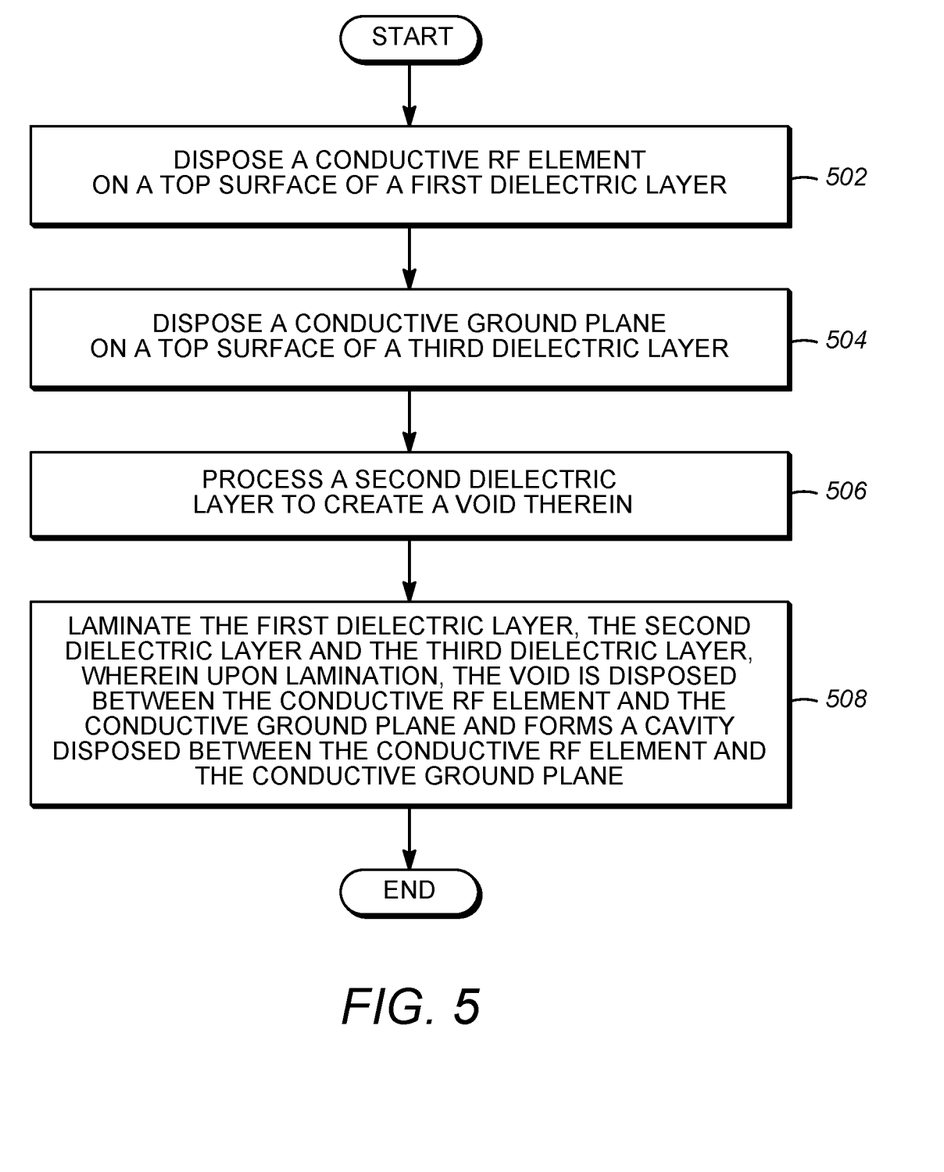
FIG. 5 is a diagram illustrating exemplary processing steps used to form one embodiment of the pressure sensor array.
Figure 6:
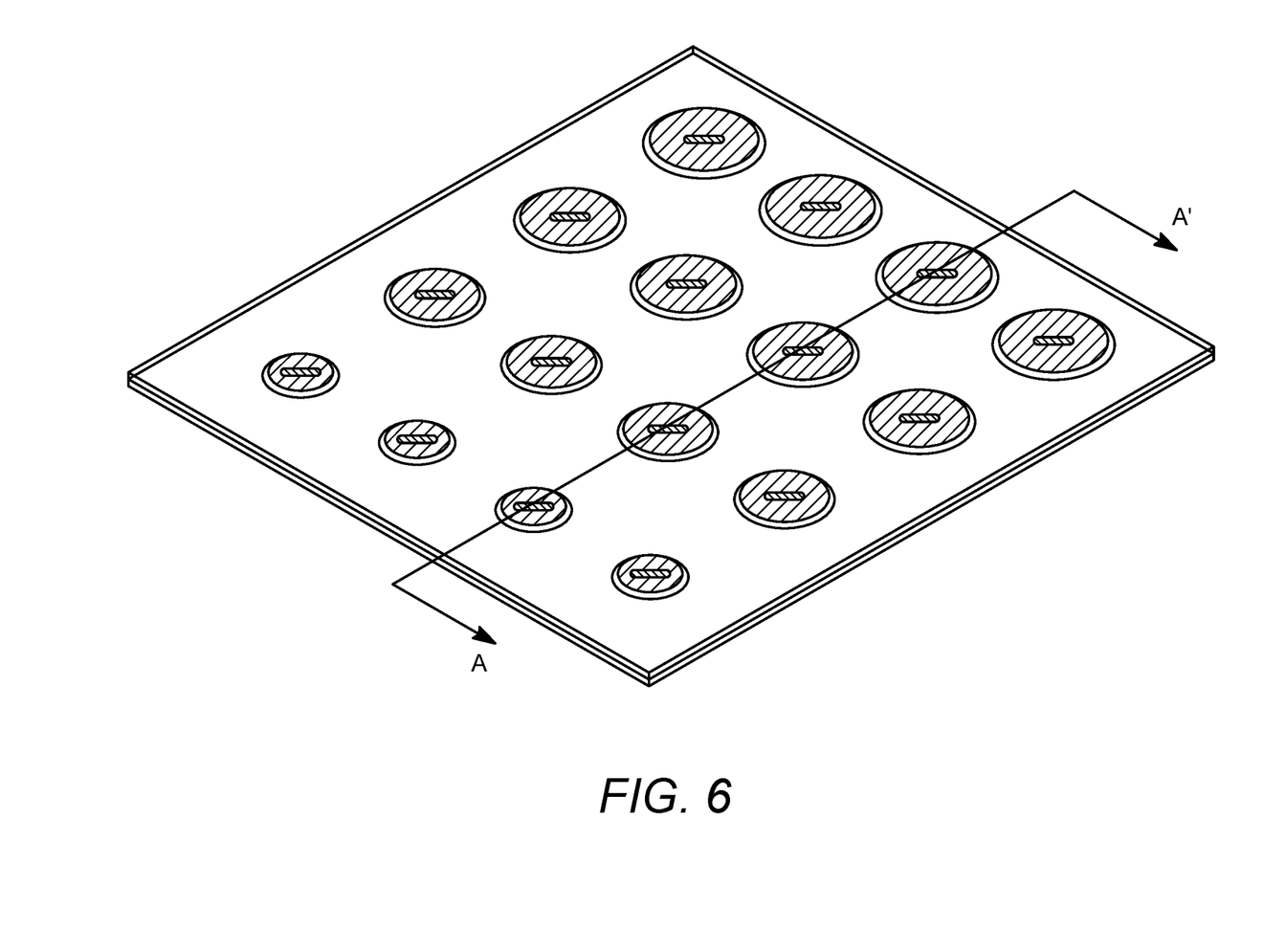
FIG. 6 depicts an exemplary pressure sensor array, illustrating a cut A-A' depicted in FIGS. 7A-7C.
Figure 7A:
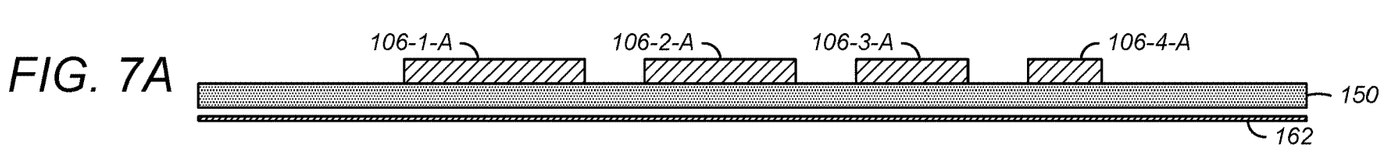
FIGS. 7A-7D, which depict exemplary process steps for producing a pressure sensor array.
Figure 7B:
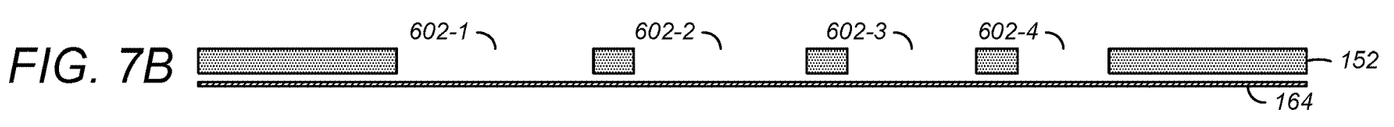
Figure 7C:
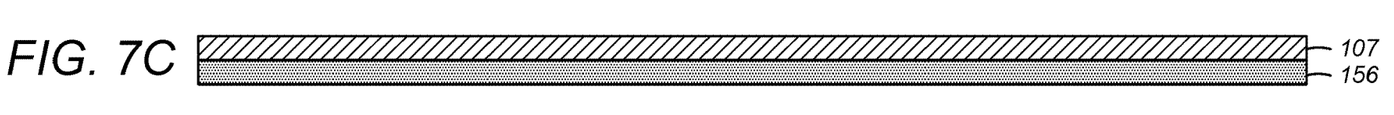
Figure 7D:
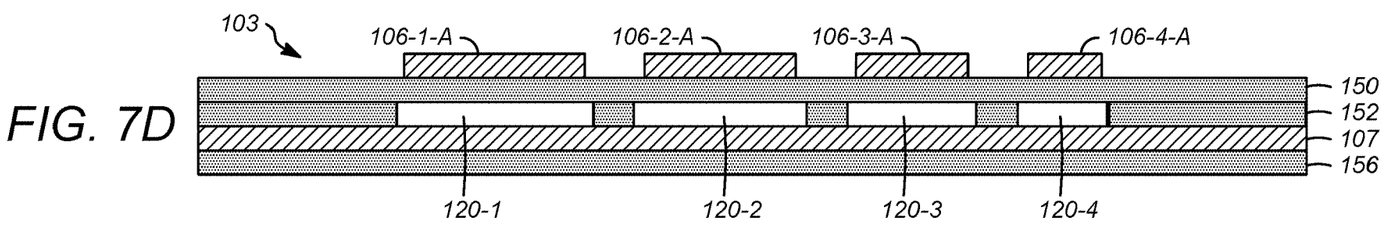

FIG. 5 is a diagram illustrating exemplary processing steps used to form one embodiment of the pressure sensor array 100. FIG. 5 is discussed with reference to FIGS. 6 and 7A-7C. FIG. 6 depicts an exemplary pressure sensor array 100, illustrating a cut A-A' which is depicted in FIGS. 7A-7C, which depict exemplary process steps for producing the pressure sensor array 100.

Turning to FIG. 5, one or more conductive RF elements 106-1-A, 106-2-A, 106-3-A and 106-4-A, are disposed on a first dielectric layer 150. This is shown in FIG. 7A. In blocks 504 and 506, a conductive ground plane 107 is disposed on a top surface of a third dielectric layer 156, and a second dielectric layer 152 is processed to create one or more voids 602-1, 602-2, 602-3 and 602-4 therein. This is shown in FIGS. 7C and 7B respectively. In block 508, the first dielectric layer 150, the second dielectric layer 152, and the third dielectric layer 156 are laminated (for example, with use of adhesive films 162 and 164) such that upon lamination, the voids 602-1, 602-2, 602-3 and 602-4 are disposed between each respective conductive RF element 106-1-A, 106-2-A, 106-3-A and 106-4-A and the conductive ground plane 107, and thus form cavities 120-1, 120-2, 120-3 and 120-4 disposed between the conductive RF elements 106-1-A, 106-2-A, 106-3-A and 106-4-A and the conductive ground plane 107. While the foregoing is described with process steps 502-506 being performed in a particular order, these process steps may be performed in any order.

The pressure sensor array 100 can be fabricated using a combination of subtractive (e.g., laser etch, milling, wet etching) methods for the cavities 120-1 and additive (e.g., printing, deposition, patterning) methods for the conductive RF elements and conductive ground plane. The layers are aligned and bonded (e.g., adhesive, thermocompression bonding). The passive wireless microphone array can be fabricated using a combination of subtractive (e.g., laser etch, milling, wet etching) methods for the cavities 120-1, 120-2, 120-3 and 120-4 and additive (e.g., printing ink, film deposition) methods for the conductive RF elements 106-1-A, 106-2-A, 106-3-A and 106-4-A and the conductive ground plane 107. After alignment, the dielectric layers 150, 152 and 156 are aligned and bonded (e.g., adhesive, thermocompression bonding).

Figure 8:
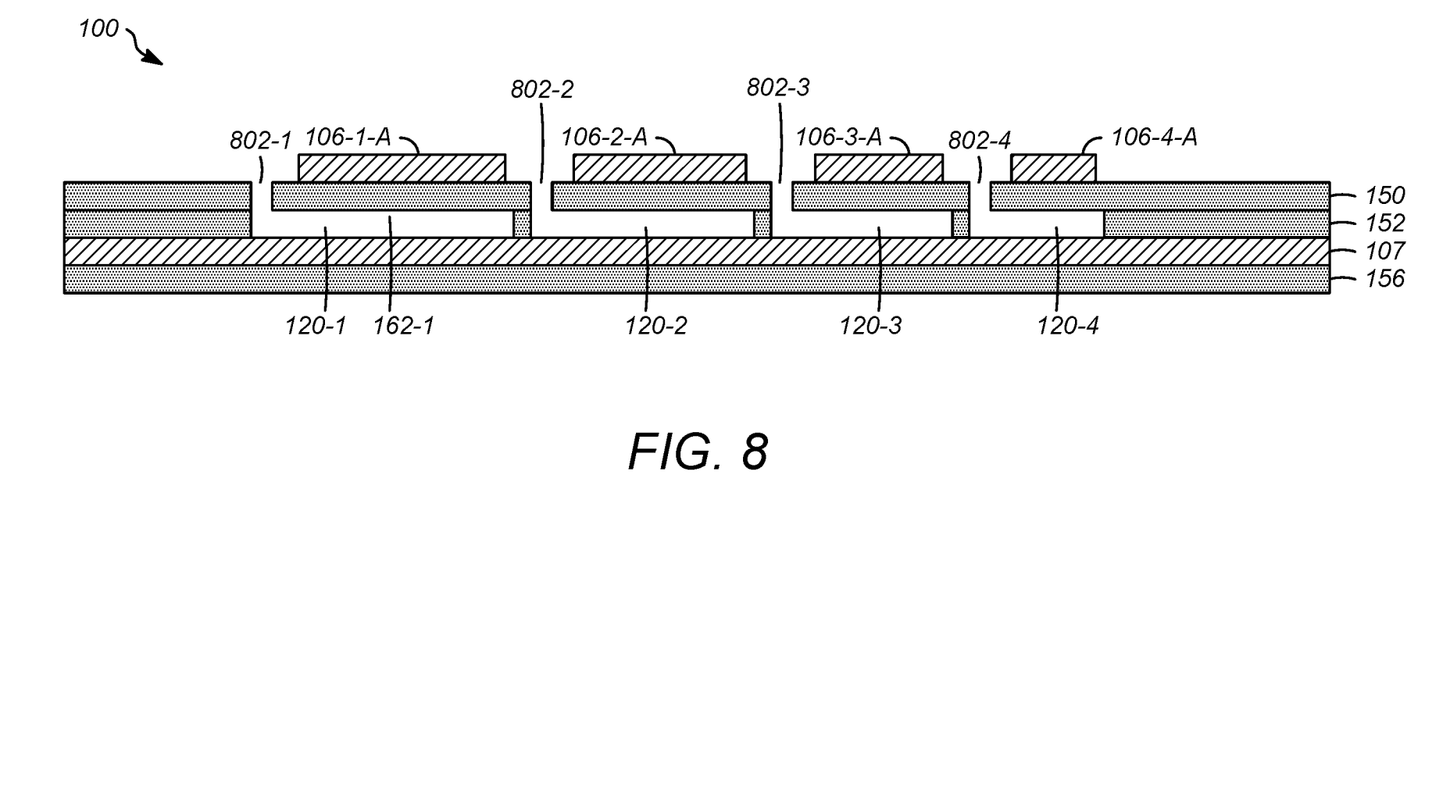
FIG. 8 is a diagram of a side view of another embodiment of the pressure sensor array.

FIG. 8 is a diagram of a side view of another embodiment of the pressure sensor array 100. In this embodiment the cavities 120-1, 120-2, 120-3 and 120-4 are not sealed, but rather are open to the ambient environment by virtue of respective ports (or vents) 802-1, 802-2, 802-3 and 802-4 that are in fluid communication with the associated cavities 120-1, 120-2, 120-3 and 120-4. This embodiment rejects static pressures well and is well suited for measuring time-varying pressure differentials that are typically encountered with audible or other aero-acoustic sources. The vent hole and channel provide a path for static pressure equilibrium above and below the diaphragm, and thus eliminates time invariant static pressure differentials across the diaphragm. Further, the vent hole and channel can be sized to control the lower acoustic turn-on frequency of the pressure sensor. By the choice of suitable dimensions of the cavity, vent hole and diaphragm, and by suitable choice of materials of the proper stiffness, the resulting pressure sensors of this design can be optimized for measurements at particular acoustic frequencies. For example, the cavity and diaphragm may be designed to be characterized by an acoustic resonance frequency in which the diaphragm responds with greater displacement to acoustic waves 164 of matching frequency than other frequencies. As a result, the pressure sensor array 100 will be more sensitive to the measurement of sound at such frequencies. Also as illustrated, the dimensions of the cavity, vent hole, channel, and diaphragm may be different for each pressure sensor of the pressure sensor array 100, thus providing enhanced sound measurement capabilities in several distinct or continuous bands. Vents 802-1, 802-2, 802-3 and 802-4 may be of any desired cross section in the plane of the pressure sensor array 100, and may also extend a distance circumferentially around the conductive RF elements 106-1-A, 106-2-A, 106-3-A and 106-4-A, thus rendering the diaphragm more flexible.

The production of this pressure sensor array 100 is analogous to that of the pressure illustrated in FIGS. 5, 6 and 7A-7C with the exception that the first dielectric layer is further processed to create the vents 802-1, 802-2, 802-3 and 802-4 before the laminating step.

Signal Transception

As described above, the pressure sensors 106 of the pressure sensor array 100 can comprise patch antenna elements in a conformal antenna used to transmit or receive RF signals. In transmission, signals provided to the feed created by conductor associated with the patch antenna elements are transformed into a transmitted RF signal, and in reception RF signals are provided to the patch antenna elements and associated structures and transformed into a received signal at the conductor.

Hardware Environment

Figure 9:
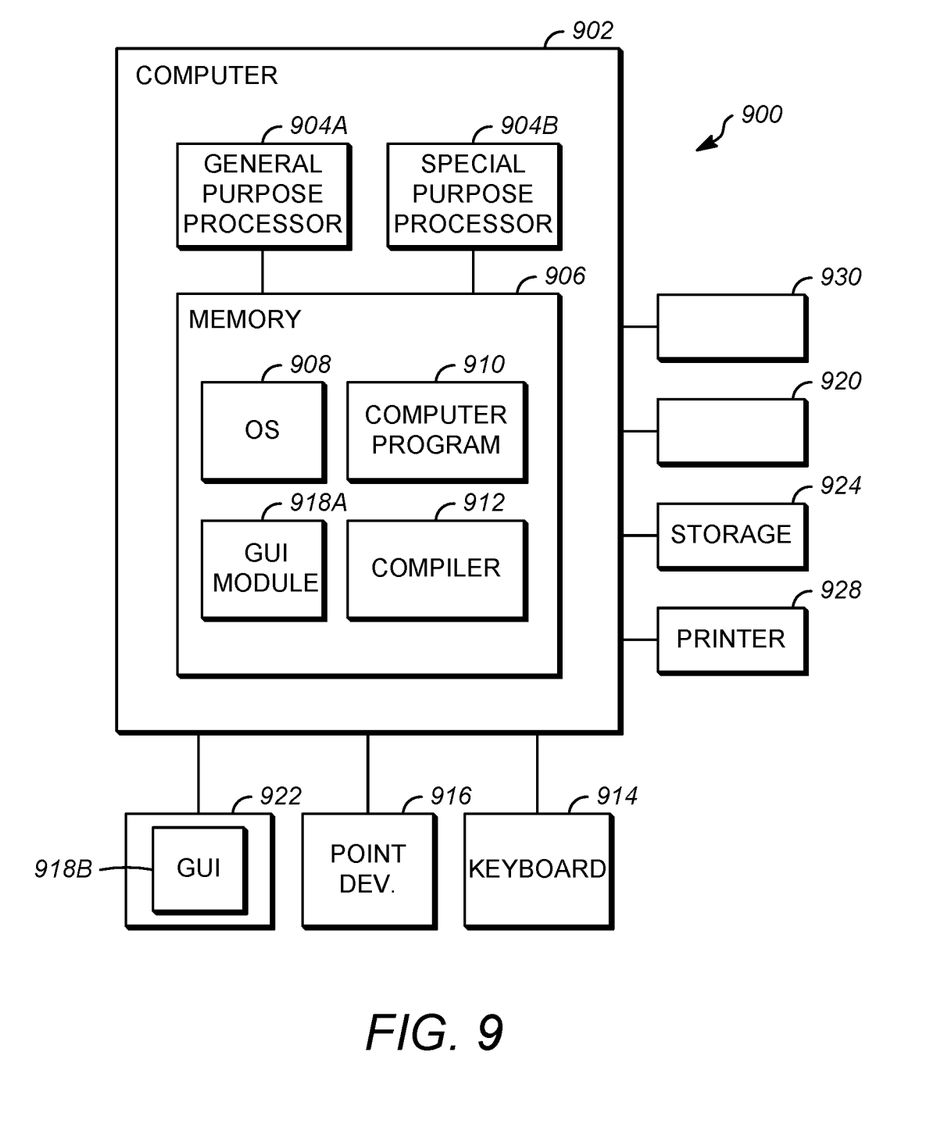
FIG. 9 is a diagram illustrating an exemplary processing system that could be used to implement processing elements.

FIG. 9 is a diagram illustrating an exemplary computer system 900 that could be used to implement processing elements of the above disclosure, including the generation of the incident EM waves, the reception of the reflected EM waves, and the processing and comparison of the transmitted and reflected EM waves. The computer system 900 may also be used in defining the defining and production of the conductive structures dielectric layers.

The computer 902 comprises a processor 904 which may include a general purpose processor 904A and/or a special purpose processor 904B (herein after referred to collectively or in the alternative as processor(s) 904) and a memory, such as random access memory (RAM) 906. The computer 902 is operatively coupled to a display 922, which presents images such as windows to the user on a graphical user interface (GUI) 918B. The computer 902 may be coupled to other devices, such as a keyboard 914, a mouse device 916, a printer, etc. Of course, those skilled in the art will recognize that any combination of the above components, or any number of different components, peripherals, and other devices, may be used with the computer 902, including printer 928.

Generally, the computer 902 operates under control of an operating system 908 stored in the memory 906, and interfaces with the user to accept inputs and commands and to present results through a GUI module 918A. Although the GUI module 918B is depicted as a separate module, the instructions performing the GUI functions can be resident or distributed in the operating system 908, the computer program 910, or implemented with special purpose memory and processors. The computer 902 also implements a compiler 912 which allows an application program 910 written in a programming language such as COBOL, C++, FORTRAN, or other language to be translated into processor 904 readable code. After completion, the application 910 accesses and manipulates data stored in the memory 906 of the computer 902 using the relationships and logic that was generated using the compiler 912. The computer 902 also optionally comprises an external communication device such as a modem, satellite link, Ethernet card, or other device for communicating with other computers.

In one embodiment, instructions implementing the operating system 908, the computer program 910, and the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of instructions which, when read and executed by the computer 902, causes the computer 902 to perform the operations herein described. Computer program 910 and/or operating instructions may also be tangibly embodied in memory 906 and/or data communications devices 930, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus for measuring a pressure, comprising:
 a pressure sensor, comprising a circuit board that includes:
  a composite dielectric, comprising:
   a first dielectric layer, having at least one conductive radio frequency (RF) element disposed thereon;
   a third dielectric layer, having a conductive ground plane disposed thereon;
   a second dielectric layer, disposed between the first dielectric layer and the third dielectric layer;
  wherein:
   the second dielectric layer comprises a void at least partially forming a cavity between the first dielectric layer and the third dielectric layer between the conductive RF element and the conductive ground plane; and
   the first dielectric layer forms a pressure sensitive diaphragm with the cavity.

2. The apparatus of claim 1, further comprising:
 a transmitter, for transmitting an incident electromagnetic wave to the pressure sensor;
 a receiver, for wirelessly receiving a reflected electromagnetic wave, the reflected electromagnetic wave having a portion of the incident electromagnetic wave reflected from the conductive RF element displaced by diaphragm movement due to the pressure; and
 a processor, for processing the received reflected electromagnetic wave to determine the measured pressure.

3. The apparatus of claim 2, wherein:
 the conductive RF element and the conductive ground plane together form a patch antenna element; and
 the processor determines the measured pressure by processing the received reflected electromagnetic wave to determine an electromagnetic resonance of the patch antenna element.

4. The apparatus of claim 2, wherein:
 the processor determines the measured pressure by processing the received reflected electromagnetic wave to determine a doppler shift between the incident electromagnetic wave and the reflected electromagnetic wave.

5. The apparatus of claim 2, wherein:
 the incident electromagnetic wave comprises a modulated signal generated by the transmitter; and
 the processor determines the measured pressure by processing the received reflected electromagnetic wave to determine a phase shift or amplitude shift of the modulated signal.

6. The apparatus of claim 1, wherein the cavity is acoustically resonant.

7. The apparatus of claim 1, wherein:
 the composite dielectric further comprises:
  a vent, in fluid communication with the cavity, the vent formed at least partially though the first dielectric layer.

8. The apparatus of claim 1, wherein:
 the pressure sensor produces a reflected electromagnetic wave from a portion of an incident electromagnetic wave, the reflected electromagnetic wave reflected from the conductive RF element displaced by diaphragm movement due to the pressure;
 the conductive RF element comprises a slot;
 the incident electromagnetic wave is a first polarization type; and
 the reflected electromagnetic wave is a second polarization type orthogonal to the first polarization type.

9. The apparatus of claim 1, wherein:
 the first dielectric layer comprises a second conductive RF element disposed thereon; and
 the second dielectric layer comprises a second void at least partially forming a second cavity between the first dielectric layer and the third dielectric layer between the second conductive RF element and the conductive ground plane;
 wherein the second cavity comprises a different volume than the cavity.

10. The apparatus of claim 1, wherein:
 the pressure sensor produces a reflected electromagnetic wave from a portion of an incident electromagnetic wave, the reflected electromagnetic wave reflected from the conductive RF element displaced by diaphragm movement due to the pressure; and
 the conductive RF element and the conductive ground plane together form a patch antenna element for transmitting or receiving electromagnetic wave independent of the incident electromagnetic wave or the reflected electromagnetic wave.

11. A method of measuring a pressure, comprising:
 transmitting an incident electromagnetic wave to interrogate an integrated antenna and pressure sensor, the pressure sensor comprising a circuit board having a composite dielectric comprising:
  a first dielectric layer, having at least one conductive RF element disposed thereon;
  a third dielectric layer, having a conductive ground plane disposed thereon;

a second dielectric layer, disposed between the first
dielectric layer and the third dielectric layer;
wherein:
the second dielectric layer comprises a void at least
partially forming a cavity between the first dielectric layer and the third dielectric layer between the
conductive RF element and the conductive ground
plane;
the first dielectric layer forms a pressure sensitive
diaphragm with the cavity;
wirelessly receiving a reflected electromagnetic wave, the
reflected electromagnetic wave having a portion of the
incident electromagnetic wave reflected from the conductive RF element displaced by diaphragm movement
due to the pressure; and
processing the received reflected electromagnetic wave to
determine the measured pressure.

12. The method of claim 11, wherein:
the conductive RF element and the conductive ground
plane together form a patch antenna element; and
processing the received reflected electromagnetic wave to
determine the measured pressure comprises processing
the received reflected electromagnetic wave to determine an electromagnetic resonance of the patch
antenna element.

13. The method of claim 11, wherein processing the
received reflected electromagnetic wave to determine the
measured pressure comprises:
processing the received reflected electromagnetic wave to
determine a doppler shift between the incident electromagnetic wave and the reflected electromagnetic wave.

14. The method of claim 11, wherein:
the incident electromagnetic wave comprises a modulated
signal; and
processing the received reflected electromagnetic wave to
determine the measured pressure comprises processing
the received reflected electromagnetic wave to determine a phase shift or amplitude shift of the modulated
signal.

15. The method of claim 11, wherein the cavity is acoustically resonant.

16. The method of claim 11, wherein:
the composite dielectric further comprises:
a vent, in fluid communication with the cavity, the vent
formed at least partially though the first dielectric
layer.

17. The method of claim 11, wherein:
the conductive RF element comprises a slot;
the incident electromagnetic wave is a first polarization
type; and
the reflected electromagnetic wave is a second polarization type orthogonal to the first polarization type.

18. A method of forming an integrated antenna and
pressure sensor, comprising:
disposing a conductive RF element on a top surface of a
first dielectric layer;
disposing a conductive ground plane on a top surface of
a third dielectric layer;
processing a second dielectric layer to create a void
therein; and
laminating the first dielectric layer, the second dielectric
layer and the third dielectric layer, wherein upon lamination, the void is disposed between the conductive RF
element and the conductive ground plane and forms a
cavity disposed between the conductive RF element
and the conductive ground plane.

19. The method of claim 18, wherein the first dielectric
layer, the second dielectric layer, the third dielectric layer are
laminated via adhesive films disposed between each dielectric layer.

20. The method of claim 18, wherein:
disposing the conductive RF element on a top surface of
a first dielectric layer comprises one of:
patterning a conductive material on the top surface of
the first dielectric layer; and
printing a conductive material on the top surface of the
first dielectric layer;
disposing the conductive ground plane on the top surface
of the third dielectric layer comprises one of:
patterning a conductive material on the top surface of
the third dielectric layer; and
printing a conductive material on the top surface of the
third dielectric layer.

21. The method of claim 18, wherein the conductive RF
element and the conductive ground plane together form a
patch antenna element for transmitting or receiving electromagnetic wave independent of an incident electromagnetic
wave or reflected electromagnetic wave.

22. An integrated antenna and pressure sensor, formed by
performing steps comprising the steps of:
disposing a conductive RF element on a top surface of a
first dielectric layer;
disposing a conductive ground plane on a top surface of
a third dielectric layer;
processing a second dielectric layer to create a void
therein; and
laminating the first dielectric layer, the second dielectric
layer, and a third dielectric layer, wherein upon lamination, the void is disposed between the conductive RF
element and the conductive ground plane and forms a
cavity disposed between the conductive RF element
and the conductive ground plane.

* * * * *